though, plutonous peroxide, when precipitated under such acidic conditions, forms in very fine crystal size, and therefore settles quite slowly and poorly from solution and tends to pass through filters when filtration is attempted. However, previous laboratory investigations had revealed that maintaining the plutonium solution heated during precipitation substantially increased the

United States Patent Office 3,033,645
Patented May 8, 1962

3,033,645
PRECIPITATION OF PLUTONOUS PEROXIDE
Burt F. Faris, Chatham, Pa., assignor to the United States of America as represented by the United States Atomic Energy Commission
No Drawing. Filed Jan. 7, 1954, Ser. No. 402,830
12 Claims. (Cl. 23—14.5)

The present invention relates in general to processes for the production of plutonium, and more particularly to an improved method for precipitating plutonous peroxide from impure aqueous solutions containing plutonium values.

As is known, plutonium—more specifically the 239 isotope of plutonium—is conventionally produced by transmutation of uranium effected by subjecting natural uranium to neutron irradiation. In current practice the product thus obtained is ordinarily a mass of irradiated uranium containing a concentration of the order of 0.02% plutonium and a like concentration of uranium fission products. However, the presence of even small amounts of uranium or fission products usually interferes with the ultimate applications of plutonium. This is especially true with respect to the fission products—isotopes having atomic numbers ranging predominantly from 30 to 63—which are in general highly radioactive and therefore greatly deleterious from both physiological and technical standpoints. Accordingly, for successful utilization, the small proportion of plutonium so produced must be isolated and recovered from the materials associated with it in the irradiated mass.

Employing customary procedures, initially the plutonium, accompanied by much of the fission product contamination, is quite readily separated from the bulk of uranium. This may be done by dissolving the irradiated mass in aqueous nitric acid, solubly complexing uranium with sulfate ion, and removing from solution the oftenminute concentration of plutonium in its tetravalent state by carrier precipitation upon bismuth phosphate. Then, for the exceedingly difficult tasks of isolating plutonium from the fission product contamination and concentrating the so decontaminated plutonium, conventional procedures involve pluralities of cycles of separate selective carrier precipitations of plutonium and of fission products from aqueous solution. Pre-eminent among such plural carrier precipitation cycle procedures is that employing a sequence of carrier precipitations with bismuth phosphate, and thereafter a sequence of carrier precipitations employing lanthanum fluoride. Initially, bisumth phosphate is employed a succession of times, in consecutive alternations, first to selectively carry plutonium and then, under alternate conditions, to selectively carry fission products away from the redissolved plutonium; thereafter lanthanum fluoride is employed a succession of times, first to selectively carry fission products, and then, under alternate conditions, to selectively carry plutonium from aqueous solution.

Then, in the interest of promoting concentration of the very small relative quantities of plutonium, the plutonium-bearing lanthanum fluoride precipitate, after separation from its supernatant, is converted by metathesis into a more acid-soluble compound, lanthanum hydroxide, still in plutonium-bearing precipitate form; this is accomplished by slurrying the lanthanum fluoride in a hot aqueous solution of alkali hydroxide and/or alkali carbonate, and separating the converted precipitate from its alkaline supernatant. Thereupon, the resulting plutonium-bearing lanthanum hydroxide precipitate is dissolved in a small quantity of aqueous nitric acid; a small amount of tetravalent zirconium values is sometimes introduced in the aqueous nitric acid at this point to promote thorough dissolution. In standard production plant practice, the foregoing operations are conventionally conducted in apparatus constituted of ferrous metal, such as stainless steel. The resulting aqueous nitric acid solution contains plutonium values highly decontaminated from fission products and ordinarily at a concentration of ca. 5 to 8 grams plutonium per liter; such solution is then ready for conventional final recovery of the plutonium values therefrom by direct precipitation as plutonous peroxide.

The foregoing conventional procedure comprises the inventions and concepts of others, and does not, per se, constitute a part of the present invention. Details of these operations are more fully set forth in co-pending applications of the common assignee:

U.S. Patent No. 2,785,951, "Bismuth Phosphate Process for the Separation of Plutonium from Aqueous Solutions," inventors Thompson and Seaborg, S.N. 174,592, filed July 18, 1950, in the names of J. E. Willard and D. E. Koshland, Jr., for Method for Dissolving Lanthanum Fluoride, now U.S. Patent 2,995,419, issued August 8, 1961, and S.N. 282,277, filed April 14, 1952, now abandoned, in the name of David M. Ritter, for Improved Oxidation of Plutonium.

It is with the aforesaid final step of precipitating plutonium from aqueous solution as plutonous peroxide in ferrous metal apparatus, that the present invention is primarily concerned. In conventional plant operation the solution at this point is ordinarily about one normal in nitric acid solution and contains, in addition to the 5 to 8 gm./l. dissolved plutonium, about 37 grams per liter of dissolved lanthanum. It has been determined that the solubility of plutonium peroxide is only of the order of 0.01 to 0.1 gram per liter in ca. 1 N $HNO_3$, such that a yield on direct peroxide precipitation from this solution of greater than 98% of the plutonium is theoretically possible. Furthermore, the peroxide anion is readily destructible, such that the precipitated plutonous peroxide may be readily converted to other desired plutonium compounds without subsistence of the original anion as contamination thereof. Also, hydrogen peroxide is suitable as the reagent for precipitating the plutonous peroxide, such that no contaminating metal cation need be introduced by the precipitation operation; as the excess hydrogen peroxide remaining in the supernatant is readily destructible afterwards, the remaining supernatant is readily adapted to recycling back to earlier points in the process in order to avoid loss of unprecipitated plutonium. Too, lanthanum ions remain largely unprecipitated upon plutonous peroxide precipitation in this manner; normally less than 1% of the original lanthanum impurity comes down with the plutonous peroxide precipitate, and this may be reduced to form 0.05% as a maximum figure upon a single reprecipitation of plutonous peroxide. All of these beneficial characteristics make peroxide precipitation highly desirable as the measure for recovering plutonium from its aqueous solution.

Normally, crystal size of the peroxide precipitate, and thereby afforded much better and more rapid settling and filterability. For instance, the prominent improvement in such practically-important characteristics achieved by maintaining the plutonium solution heated (e.g. to 60° C.) during precipitation, as compared with similar precipitation effected simply at room temperature (i.e., ca. 25° C.), is demonstrated by the empirical data reported in Table I below.

TABLE I

*Favorability of Maintaining Solution Heated During Precipitation of Plutonous Peroxide From Laboratory-Prepared Plutonium Solutions*

Initial solution, synthesized in laboratory:
    Aqueous—
        8.25 g. $Pu^{+4}$/liter.
        68.9 g. $La^{+++}$/liter.
        1.43 g. $K^{+}$/liter.
        1 N $HNO_3$.
Volume of solution portions: 10 ml.
Precipitation: 30% aqueous $H_2O_2$ added until 10% by wt. as excess, over 1 hour; agitated with driven plastic rods.
Digestion: Additional 2 hours with agitation.
Separation of supernatant: Settling and decantation.
Washings: 3 with 0.25 N $HNO_3$; slurried, settled, decanted.

|  | Room Temperature run | Run Maintained heated |
|---|---|---|
| Temperature maintained | Ca. 25° C | 60° C. |
| Total vol. of slurry | 15 ml | 15 ml. |
| Character of precipitate | Very finely divided | Relatively more granular. |
| Rate of settling | Slow | Rapid. |
| Volume to which precipitates settled in 15 min. after 2 hour digestion | Ca. 11 ml | Ca. 1.1 ml. |
| Appearance of supernatant after above settling period | Turbid | Clear. |
| Number of washings | 3 | 5. |
| Plutonous peroxide yield after washing | 97% | 99%. |

Further investigation of laboratory plutonium solutions in this connection indicated that the apparent practical optimum for the elevated temperature to which plutonium solutions should best be maintained heated during plutonous peroxide precipitation approximated 60° C.; any closer approach to the boiling point seems to incur a deleterious pronounced rise in the solubility of plutonous peroxide. Illustrative of the same is the empirical data presented in Table II below.

TABLE II

*Apparent Optimum Elevated Temperature for Precipitation of Plutonous Peroxide From Laboratory-Prepared Plutonium Solutions*

Initial solution:
    Aqueous—
        8.25 g. $Pu^{+4}$/liter.
        68.9 g. $La^{+++}$/liter.
        1.43 g. $K^{+}$/liter.
        1.0 N $HNO_3$.
Volume of solution portions: 1.0 ml.
Precipitation: 30% $H_2O_2$ added in four portions at 15 min. intervals, some to 5% by wt., some to 10% by wt., with agitation.
Digestion: Additional period with agitation.
Settling: Containers removed, and allowed to settle to ca. 10% of total volume of slurry; supernatants analyzed.
Washing: 25% of original solution volume of 0.25 N $HNO_3$.

| Time of settling, min. | Plutonium yield, percent |||||| 
|---|---|---|---|---|---|---|
|  | 5% excess $H_2O_2$ ||| 10% excess $H_2O_2$ |||
|  | 40° C. | 60° C. | 80° C. | 40° C. | 60° C. | 80° C. |
| After digestion (1 hour) | 5 | 93.0 | 96.1 | 97.0 | 93.9 | 98.2 | 97.5 |
| After digestion (3 hours) | 5 | 98.1 | 98.6 | 96.4 | 97.5 | 99.1 | 96.8 |
| One washing | 20 | 98.0 | 98.4 | 96.0 | 97.3 | 99.0 | 96.5 |

Upon attempting practical application of plutonous peroxide precipitation, under the laboratory-established procedure of maintaining the plutonium solution heated during the precipitation, for final recovery of plutonium in actual plutonium production on semi-works and production-plant scales, serious difficulties were immediately encountered. Despite particular care in maintaining the temperature at 60° C., in some instances plutonous peroxide would not precipitate at all upon the addition of the hydrogen peroxide. In other instances some plutonous peroxide precipitate would form initially, but would partially or completely redissolve during the customary digestion at 60° C. Adversely, this resulted in no, or intolerably low, recovery of the plutonium from solution. These effects were noted to be accompanied at times by some effervescence and foaming of the plutonium solution. As a practical matter, this phenomenon was recognized to preclude further resort or reliance upon plutonous peroxide precipitation for such recovery in plutonium production operations, unless and until these difficulties could be overcome.

This phenomenon, being a function of the past processing history of the plutonium solution, is believed attributable to contaminants and impurities still associated with the plutonium at this stage in the conventional plutonium production operations. More particularly, upon investigation along this line, spectrographic analyses showed that plutonium-containing nitric acid solutions arriving for the peroxide precipitation step in the standard production procedure are contaminated with slight, but apparently potent, amounts of ferric, and sometimes zirconium, ions. The presence of ferric ions in the plant plutonium solutions apparently stems from corrosion of the stainless steel vessels within which the plutonium values and solutions had been processed earlier in the overall production procedure; zirconium ions are apparently present as the result of zirconium additions earlier in the production scheme. Ordinarily the ferric ion concentration in the one normal nitric acid solution of plutonium arriving for the peroxide precipitation step approximates 0.01 molar, while that of the zirconium ions is so little as approximately $10^{-4}$ to $10^{-5}$ molar. Furthermore upon addition of ferric ion to such order of concentration to glassware-contained laboratory plutonium solutions, and thereupon applying the accepted 60° C. hydrogen peroxide addition procedure for precipitating plutonous peroxide, the same adverse phenomenon of redissolution of the plutonous peroxide precipitate, after formation, has been observed. As the operative mechanism producing these effects, it is believed that the small amounts of ferric ion, and separately of zirconium ion, present serve to decompose and/or catalyze the decomposition of plutonous peroxide and hydrogen peroxide in the solution under these conditions, such that effective recovery of the plutonium as precipitated peroxide is hampered and prevented.

While attempting removal of the obnoxious ferric and zirconium ions from further interference with the peroxide precipitation may suggest itself as a possible resolution of the difficulty, the problem is further compounded by a particular undesirability for any additives, which would tend to contaminate the final recovered plutonium, to be incorporated in the solution. In view of the necessity for high purity of the produced plutonium, incorporation into the solution of extraneous materials which provide cations or anions which would accompany the plutonium must generally be avoided. Too, the quite low concentrations of ferric ion and zirconium ion in the encountered plant solutions leave little room for much further reduction in ferric or zirconium ion concentration by any such measure.

In view of the otherwise eminently advantageous characteristics of plutonous peroxide precipitation for plutonium recovery at this point in conventional plutonium production operations, there has been an increasing desire that new, effective means be found for overcoming the encountered difficulties, and thus providing operative and efficient precipitation of plutonous peroxide from such contaminated solutions.

Accordingly, one object of the present invention is to provide an improved process for the precipitation of plutonous peroxide from an aqueous plutonium solution contaminated with dissolved iron and/or zirconium.

Yet another object is to provide measures in such a process for promoting rapidity of separation of the precipitated plutonium peroxide from its supernatant solution.

Additional objects will become apparent hereinafter.

In accordance with the present invention a new and improved process for precipitating plutonous peroxide from an aqueous acidic solution containing plutonous ions along with dissolved metal contaminants of the group consisting of iron and zirconium comprises maintaining said aqueous solution at a temperature of substantially 20° C., thereupon introducing aqueous hydrogen peroxide gradually into the solution being so maintained, to thereby form a plutonous peroxide precipitate, thereafter reducing the temperature of said solution from said maintained 20° C. and thereupon maintaining said solution refrigerated to a temperature substantially within the range of 0° to 10° C., to thereby promote expeditious settling of said formed plutonous peroxide precipitate from the body of said solution, and subsequently decanting the aqueous supernatant liquid from the settled plutonous peroxide precipitate. In this two-temperature procedure, a duration of time of one hour over which said solution is so maintained at a temperature approximating 20° C., before reducing the temperature to the lower level, is particularly appropriate. As the basis underlying this special two-temperature procedure of the present invention, it was experienced that plutonous peroxide precipitated within the specified range of 0° to 20° C. generally forms—in extrapolation of the trend indicated in Table I supra—in extremely fine crysal size; its filterability qualities are so poor that it tends to clog simple filters such that attempted filtration of the plutonous peroxide takes a rather undesirably and impractically long time to accomplish. As a further consequence of the fineness of crystal size, it happens that in operating at any particular constant temperature within the range 0° to 20° C., the plutonium peroxide precipitated doesn't then readily settle out of the body of supernatant solution. However, applicant has discovered that by proceeding in accordance with the specified two-temperature procedure, the plutonous peroxide settles sufficiently rapidly that in a matter of only a few hours of settling the settled precipitate may be segregated from its supernatant body of liquid by simple decantation, with adequately high yields of recovered plutonium obtaining. In applicant's two-temperature procedure, effecting the precipitation itself at 20° C. proves to promote a maximum coarseness of crystal size obtainable, while still effectively avoiding the deleterious effects of iron and/or zirconium induced peroxide decomposition which would be encountered in higher temperatures. Also, under these conditions the plutonium evidently does not react instantaneously with the hydrogen peroxide; following precipitation the apparent solubility of the precipitated plutonous peroxide has been observed to decrease over periods so long as an hour after initial introduction of hydrogen peroxide. Therefore to maintain the solution at approximately 20° C. for at least an hour has been found preferable to promote thoroughness of reaction, before reducing the temperature to the lower temperature range. After reducing to the 0° to 10° C. range, though, this lower temperature gives evidence of enhancing markedly the settling rate of the plutonous peroxide precipitate formed at 20° C. Such observed enhancement is believed attributable to avoidance of a likely occurrence of some dissolved-iron and/or dissolved-zirconium induced decomposition of hydrogen peroxide or plutonous peroxide at temperatures above ca. 10° C., which, although slight, is enough to keep the solution sufficiently in motion—probably due to latent effervescence—to disrupt effectively the attempted settling of the fine particles of plutonous peroxide. In any event, after reducing the temperature to within the 0° to 10° C. range, the plutonous peroxide originally formed at coarseness-promoting 20° C. proves to settle out well in ca. 2 hours, and substantially completely in about 5 to 9 hours. For example, in applying applicant's special two-temperature procedure to aqueous plutonium-containing acidic solutions arriving for peroxide precipitation, after having been processed in stainless steel vessels, in semi-works scale application of the aforementioned standard $BiPO_4$—$LaF_3$ cycle plutonium production operations, it was found that upon cooling to 20° C. and adding 30% hydrogen peroxide continuously over an hour so that the solution was made 10% by weight in stoichiometric excess hydrogen peroxide, and then reducing and maintaining the system refrigerated to 10° C., the resulting plutonous peroxide precipitate regularly settled out rather completely within 5 hours, leaving a readily decantible supernatant containing a total remaining concentration of dissolved and suspended plutonium values often less than 100 milligrams Pu per liter. Being of such efficiency, and having such beneficial attributes, the present process clearly affords substantial practical advantages in plutonous peroxide precipitation and recovery.

In conducting the present invention, the compositions of aqueous plutonium solutions to which the instant plutonium peroxide precipitation process may effectively be applied are subject to wide variation. The solution should, though, be acidic in the interest of avoiding the occurrence of polymerization and colloidality of dissolved plutonium ions which tends to occur in dilute solutions under more alkaline conditions. The particular pH values at which tetravalent plutonium ions commence to manifest such polymerization and colloidality are outlined in Table III below; in general, it is desirable that the solutions be maintained constantly more acidic than the pertinent pH level indicated in Table III.

TABLE III

*Approximate pH's Above Which Polymerization and Colloidality of Tetravalent Plutonium Becomes Prevalent in Aqueous Nitric Acid Solutions*

| Concentration of $Pu^{+4}$: | pH |
|---|---|
| $10^{-5}$ M | 3 |
| $10^{-4}$ M | 2½ |
| $10^{-3}$ M | 2 |
| $10^{-2}$ M | 1½ |
| $10^{-1}$ M | 1 |

At much greater acidities, though, the solubility of plutonium peroxide adversely increases. For providing the acidity, aqueous mineral acids are appropriate, with nitric acid being preferred. Aqueous nitric acid containing a proportion of sulfuric acid therewith is also well suited for the purpose. For plutonium concentrations approximating 8 grams per liter, as encountered in production plant solutions ready for peroxide precipitation, nitric acid concentrations within the approximate range 0.5 to 2 normal are in order, while ca. 1 normal $HNO_3$ is particularly preferred. Concerning the extent of contamination of the solution with iron and/or zirconium ions, it may initially be said that application of the present process should afford some benefit in the presence of any amount of iron and/or zirconium ions, however small. Further, the present process, especially the two-temperature version, has proven eminently effective when applied as the peroxide precipitation step in the aforementioned standard plutonium production operations, when the contamination of the solution generally approximated 0.01 molar in ferric ion and $10^{-4}$ to $10^{-5}$ molar in tetravalent zirconium ion. Beyond this, applicant's process has been found successful in the presence of dissolved iron concentrations so great as 0.05 molar and dissolved zirconium of concentrations as high as 0.001 molar, without substantial decomposition of peroxide occurring. Generally speaking, the greater the concentration of plutonium in the initial solution, the better, in the interest of affording a plutonium content transcending the solubility of plutonous peroxide as greatly as possible. In plutonium production plant solutions as aforesaid, the concentration of dissolved plutonium usually approximates 8 grams per liter, which amply satisfies the requirement. However, the present process has been applied with effect to aqueous plutonium concentrations as small as 150 milligrams per liter. Also normally present in such plutonium production solutions are trivalent lanthanum ions concentrations of the order of 30 to 50 grams per liter, at which concentration the lanthanum manifests little effect upon the plutonous peroxide precipitation.

Hydrogen peroxide is the preferred precipitant. Use of hydrogen peroxide, rather than other simple peroxide compounds such as sodium peroxide, is desirable toward avoiding possible further contamination of the plutonium with a metal cation of the precipitant. To mitigate undesirable excessive further dilution of the solution by the precipitant, it is desirable to add the hydrogen peroxide in concentrated aqueous form; 30% aqueous $H_2O_2$ is appropriate. Addition of a substantial stoichiometric excess of hydrogen peroxide is in order toward promoting completeness of reaction with plutonium; adding sufficient hydrogen peroxide to make the resulting solution 10% by weight in a stoichiometric excess thereof is well suited.

The valence state of plutonium in the precipitated peroxide is evidenced to be the tetravalent. Accordingly, it is advantageous for all of the plutonium to be in dissolved tetravalent state at the commencement of peroxide precipitation. Nevertheless, aqueous hydrogen peroxide is an effective reductant for plutonium in pentavalent and hexavalent state, serving to convert the same to tetravalent state, and further happens to be an effective oxidant for trivalent plutonium, converting the same also to tetravalent state; it is expectable that amounts of plutonium, when dissolved in other than the tetravalent oxidation state at the outset, should become automatically converted to tetravalent state upon hydrogen peroxide addition, as a further beneficial attribute of employing hydrogen peroxide in the instant plutonium recovery method.

The presence of sulfate ion in the solution is frequently desirable for reason that it seems to enhance somewhat the physical quality of the peroxide precipitate obtained. That is, when plutonous peroxide is precipitated in the presence of sulfate ions, the precipitate obtained appears to be a darker green, of somewhat larger particle size, and of somewhat lower solubility than that precipitated in the absence of sulfate. In this regard, sulfate ions may be present in the form of sulfuric acid; approximately 0.1 to 0.5 normal sulfate ion is appropriate, while ca. 0.2 normal sulfate ion is particularly preferred. Where addition of sulfate ion to an existing plutonium solution is desired for this purpose, its addition in the form of ammonium sulfate is advantageous; this avoids further increasing the acidity of the solution, while the readily-destructible ammonium cation avoids further contamination of the plutonium with additional metal cations at this point.

To realize the advantages of the present invention, it is most necessary that the solution be maintained substantially within the range 0° to 20° C.—that is, within so little as plus or minus 2° C. of this range—throughout precipitation and settling of the plutonous peroxide. Such rigorous control of the temperature is especially important in the particularly preferred two-temperature version of the present process. That is, for the initial precipitation and digestion the temperature should be maintained at 20° plus or minus 2° C. until it is dropped quickly to the lower temperature range of 0° to 10° C.—again with a tolerance of the order of plus or minus 2° C. for the range—for the settling to proceed. Within the latter range, that of 5° to 8° C. appears to be the practical optimum; an ample margin of safety from the freezing point of these dilute aqueous solutions is afforded thereby. Agitation of the solution during the initial peroxide addition and digestion phases is occasionally beneficial toward accelerating the sluggish reaction of the plutonium with the hydrogen peroxide, but it is best to retain the solution very quiet and undisturbed during the subsequent settling phase after reduction of the temperature to the 0° to 10° C. range.

Generally speaking, the time required for accomplishing effective formation of the plutonium peroxide precipitate under these conditions ranges from about 15 minutes to 2 hours; one hour is usually an efficient duration. In the interest of economy of hydrogen peroxide, it is advisable to add the aqueous hydrogen peroxide to the solution gradually over at least the first 15 minutes of the period of precipitate formation and better over a full hour; since the reaction of plutonium with the hydrogen peroxide is slow at or below 20° C., this provides the $H_2O_2$ as it is needed, while mitigating the amount of $H_2O_2$ exposed to decomposition in the solution as the reaction proceeds. For conducting the special two-temperature procedure, the plutonous peroxide precipitate is initially formed with the foregoing timing at 20° C., whereupon the temperature of the system is dropped to the lower level; a period of from 5 to 9 hours in the 0° to 10° C. range is usually needed for substantially complete settling of the formed plutonous peroxide from the quiescent solution. Although it has been found that slightly more complete settling of suspended plutonium peroxide may be realized upon extending the period within the 0° to 10° C. range to 24 hours, this is normally unwarranted. However, in practice, where the remaining supernatant after the precipitate formation and settling is recycled to earlier points in the plutonium production operation to thereby avoid loss of the unsettled plutonium therein, a settling period in the 0° to 10° C. range of only two hours is ordinarily adequate as a practical matter.

The selection of particular apparatus for maintaining the solution cooled during peroxide precipitation is non-critical. Simply, a jacketed vertical tank, optionally provided with an agitator for use to accelerate the precipitate formation phase, has proven adequate. There, to refrigerate the solution, water, brine, or other heat transfer medium, thermostated to the desired temperature, is circulated through the jacket enveloping the tank. Toward mitigating the adverse effects resulting from contact of the plutonium solution with ferrous metal, a glassware, or glass-lined, tank is to be preferred, although stainless steel tanks have proven suitable for the purpose in plant scale production. For separation of the formed plutonous peroxide precipitate from its supernatant liquid, decantation after settling is the particularly preferred technique. This is simply accomplished by syphoning the layer of supernatant liquid from over the settled precipitate; by gradually lowering the mouth of the syphon into the tank as the supernatant liquid level recedes, while observing the relative position of the surface of the settled precipitate, a sharp separation of most of the supernatant liquid from the wet precipitate may be achieved. Covering the mouth of the syphon with a filter is beneficial toward mitigating possible plutonium losses with the supernatant liquid. In lieu of reliance upon gravitational settling of the formed precipitate, centrifugation is an applicable alternative, especially in the practice of the present invention without resort to special two-temperature procedure. Although centrifugation does accelerate the settling operation, it is preferred in plant practice of the two-temperature procedure for the plutonous peroxide precipitate to settle simply by gravity; the extra time required for the settling is not wasted, but rather results in a more complete reaction of the hydrogen peroxide with remaining plutonium ions in solution.

To promote thoroughness of isolation from the dissolved-iron-containing solution, it is desirable to wash the wet plutonium precipitate heel remaining after decantation of its supernatant liquid by reslurrying the precipitate in aqueous wash liquid, resettling, and redecantation. Although plain water is useable as wash liquid, it is desirable that the wash liquid be mildly acidic to avoid dissolution-promoting polymerization of dissolved plutonium ions therein; ca. 1 N $HNO_3$ is satisfactory, as alternatively is dilute—say ¼ to ½ normal—$H_2SO_4$. The precipitate is best slurried in about an equal quantity of said wash liquid, for example by agitating for about five minutes, and then the system is maintained quiescent at approximately 0° to 10° C. to promote settling, which is usually substantially complete in about 30 minutes. Three such washes, followed in each case by decantation of the spent wash liquid and combination of the same with the decanted original supernatant is amply effective. Thereafter, for further decontamination of the precipitated plutonium, the washed peroxide precipitate may be dissolved, and reprecipitated as peroxide, repeating applicant's procedure, one or more times, as may appear necessary. Warm concentrated nitric acid—say 60% $HNO_3$—dissolves the plutonous peroxide precipitate rapidly and thoroughly with oxygen evolution; after dilution of the resulting solution to ca. 1 N $HNO_3$, the solution stands ready for repetition of applicant's peroxide precipitation procedure. More than one repetition of peroxide precipitation is ordinarily not warranted; even where the plutonium ion is contaminated with four to five times its weight of lanthanum ion, as it is encountered in plutonium production plant solutions arriving for peroxide precipitation, one repetition of the peroxide precipitation procedure ordinarily serves to free the plutonium of more than 99.95% of such original lanthanum contamination, and thus is ordinarily adequate. Thereafter, the final wet plutonium peroxide precipitate, whether obtaining from the original precipitation or repetition thereof, is then readily evaporated to near dryness by application of vacuum, thereby producing a plutonous peroxide product ready for future use.

As a matter of caution, where the plutonium being processed is in the form of one of the fissionable isotopes thereof, the apparatus should best be of sufficiently small size to avoid the accumulation of a supercritical chain-fission-reactive amassment of plutonium in any one batch undergoing precipitation; as a rule of thumb, where isotopically pure plutonium-239 is being processed, no more than 250 grams of plutonium should be assembled together at any one time.

Further illustration of the quantitative aspects and preferred procedures of the present invention is provided in the following specific examples. The first three examples typify the difficulties encountered in attempting practical application to plutonium production plant solutions of the previously-established elevated temperature procedure for plutonous peroxide precipitation, which difficulties included failure of plutonous peroxide to precipitate, redissolution of plutonous peroxide which had precipitated, and general inordinately high solubilities of plutonous peroxide in the systems.

EXAMPLE I

An approximately half-liter portion of aqueous acidic plutonium solution was withdrawn from each of a series of separate runs in conventional plutonium production operations on a semi-work scale. Generally, the conventional plutonium production operation practiced commenced with concentrated nitric acid dissolution of neutron-irradiated uranium metal, dilution, solubly complexing the uranium in the resulting solution with aqueous sulfuric acid, and thereupon, while maintaining the plutonium in solution in tetravalent oxidation state, selective carrier precipitation of the plutonium from solution, away from the bulk of the solubly complexed uranium, upon a bismuth phosphate carrier precipitate. After concentrated nitric acid dissolution of the resulting plutonium-containing bismuth phosphate carrier precipitate, the resulting dissolved plutonium was subjected to a plurality of carrier precipitation cycles employing bismuth phosphate as the carrier, followed by one carrier precipitation cycle employing lanthanum fluoride as the carrier, as generally described hereinbefore, concluding with a lanthanum fluoride carrier precipitate carrying a major portion of the original plutonium. Virtually all such operations had been conducted in aqueous nitric acid media in stainless steel apparatus. In each run, plutonium-carrying lanthamum fluoride precipitate was metathesized to a plutonium-containing lanthanum hydroxide precipitate either by digesting in 45% aqueous potassium carbonate solution or in one case, as indicated below, by digesting in aqueous 15% potassium hydroxide plus 10% potassium carbonate, at ca. 75° C. In each case the resulting plutonium-containing lanthanum hydroxide precipitate was dissolved in ca. 1 normal nitric acid containing a concentration of ca. 37 grams per liter of dissolved lanthanum. It was at this point in each semi-works run that the aforesaid portion of the obtaining solution was separately withdrawn. In each case the volume of the solution withdrawn was nominally 450 cc., but among the different portions it varied as much as 20% from this figure.

Too, in certain of the semi-works runs, small portions of the plutonium-containing lanthanum fluoride carrier precipitate had been withdrawn and subjected to similar metathesis and aqueous nitric acid dissolution in glassware laboratory equipment, providing similar aqueous acidic plutonium solutions. Similar approximately half-liter portions of these solutions were withdrawn also.

Each of the solution portions so derived was treated in substantially the same manner. As these semi-works runs were being conducted upon considerably lower plutonium concentrations than ordinarily encountered in full plant scale operation, the plutonium concentration in each solution portion was increased to between 7 and 8 grams plutonium per liter, as ordinarily encountered in plant scale operation at this point, by addition of pure concentrated plutonium values. All solutions were made 0.2 normal in $H_2SO_4$. Then, while maintaining the temperature of the solution at 55° to 60° C. throughout, aqueous 30% hydrogen peroxide was added in four equal portions at 15 minute intervals. The precipitate was digested for two hours at 55° to 60° C. following the beginning of the hydrogen peroxide addition. Thereafter the supernatant liquid was separated by decantation from whatever plutonous peroxide precipitate was formed, and analyzed for plutonium content to determine the manifested solubility of plutonous peroxide in each case. The determined solubilities in each case, along with analytically determined molarity of dissolved iron in each original solution portion are tabulated in Table IV below.

TABLE IV

*Plutonous Peroxide Precipitation From Semi-Works Aqueous Plutonium Solutions at Elevated Temperatures*

| | Semi-works run number | | | | | | | | | | | | |
|---|---|---|---|---|---|---|---|---|---|---|---|---|---|
| | D-211 | D-212 | D-213 | D-214 | D-215 | D-216 | D-217 | D-218 | D-219 | D-220 | D-221[1] | D-222 | M-8[2] |
| Iron molarity: Solution derived by— | | | | | | | | | | | | | |
| Semi-works metathesis | 0.0102 | 0.0051 | 0.00564 | 0.0128 | 0.00908 | 0.007 | 0.0134 | 0.00438 | | | 0.020 | | |
| Laboratory metathesis | | | | | | | | | 0.0075 | 0.0039 | 0.0036 | 0.0021 | 0.0056 |
| MANIFESTED | | | | | | | | | | | | | |
| Plutonous peroxide solubility (mg. Pu/liter : Solution derived by— | | | | | | | | | | | | | |
| Semi-works metathesis | 285 / 211 / 420 | 240 | 210 | 5,430 / 223 | 3,670 | 114 / (3) | (3) | (3) | | | (3) | | |
| Laboratory metathesis | | | | | | | | | (3) | (3) | (3) | (3) | (3) |

[1] $K_2CO_3$ plus KOH employed for metathesis.    [2] Special run.    [3] Dissolved.

EXAMPLE II

A quantity of aqueous plutonous nitrate solution was prepared in laboratory apparatus, such that it was ca. 0.5 normal in nitric acid, ca. 0.5 normal in sulfuric acid, and contained ca. 0.01 molar ferric ion. The concentration of plutonium was ca. 5.5 grams per liter. Several 5 milliliter portions of the prepared solution were each maintained throughout at a different temperature as indicated, 30% aqueous hydrogen peroxide was added over a period of 15 minutes to make the solution 10% by weight in excess $H_2O_2$. This was followed by digestion of the system for two hours at the indicated temperature. Thereupon, in each case, the resulting precipitate was separated by filtration through a medium porosity sintered glass filter. The presence or absence of precipitate, the rate of filtration, and the visual appearance of the filtrate were noted; the filtrate was analyzed for plutonium, and the manifested solubility of the plutonous peroxide and the percentage yield in the precipitate of the total plutonium present were calculated therefrom. Results are tabulated in Table V below. Thereafter the experiments at 30° C. and 40° C. were repeated, with the exception of using more porous stainless steel filters of porosity corresponding with that of filters appropriate for plant scale application. The precipitate that formed at 30° C. passed through this filter, while that formed at 40° C. produced only a slightly turbid filtrate (Pu yield in precipitate 97.0%).

TABLE V

*Precipitation of Plutonous Peroxide at Elevated Temperatures in Presence of 0.01 M Fe*

| Temperature (° C.) | Filtration | | Manifested solubility (mg. Pu/liter) | Percent yield of Pu |
|---|---|---|---|---|
| | Rate | Filtrate | | |
| 30 | Slow[1] | Clear | 55 | 99.0 |
| 40 | Normal | do | 176 | 96.8 |
| 50 | do | Faintly turbid | 220 | 95.1 |
| 60 | | Precipitate dissolved after 1½ hrs. | | |

[1] Impracticable rate.

EXAMPLE III

The 60° C.-2 hour plutonous peroxide precipitation procedure of Example I was applied to a series of similar aqueous acidic plutonium solutions prepared in the laboratory with pure plutonium and into which were incorporated various concentrations of ferric ion and/or tetravalent zirconium ion as indicated, and the resulting solubilities of the plutonous peroxide manifested under the very carefully controlled laboratory conditions of precipitation were determined. Results are presented in Table VI below.

Table VI

*Manifested Solubilities of Plutonous Peroxide in Presence of Fe and Zr Contamination*

| Fe molarity | Zr molarity | $PuO_4$ solubility (mg. Pu/liter) |
|---|---|---|
| 0 | $5 \times 10^{-4}$ | 37.5 |
| 0 | $5 \times 10^{-3}$ | 250 |
| 0 | $1 \times 10^{-2}$ | 420 |
| 0 | $1 \times 10^{-1}$ | 4,250 |
| $5 \times 10^{-4}$ | $5 \times 10^{-4}$ | 80 |
| $1 \times 10^{-3}$ | $5 \times 10^{-3}$ | 300 |
| $5 \times 10^{-3}$ | $1 \times 10^{-3}$ | 570 |
| $5 \times 10^{-3}$ | $5 \times 10^{-3}$ | 5,400 |

The following Example IV demonstrates that while maintaining the solution refrigerated to the range of 0° C. to 20° C. throughout plutonous peroxide precipitation in general accordance with the present invention does beneficially avoid and overcome substantially the former difficulties of incompleteness or failure of precipitation, there is encountered a shortcoming that the precipitate formed is of such small crystal size that filtration of the resulting precipitate proved to be impracticably slow.

EXAMPLE IV

The procedure of Example II was repeated, with the essential exception that instead of maintaining the solutions heated, they were maintained refrigerated at specific temperatures within the range 0° to 20° C. throughout the precipitation and filtration. In one case, as indicated, after filtration the filtrate was found to be so turbid that centrifugation was needed to remove the remaining plutonous peroxide precipitate therefrom. In each case the rate of filtration and character of the filtrate was visually observed, and the manifested solubility of the plutonous peroxide under the circumstances and the percentage yield in the precipitate of total plutonium present was determined. Results are tabulated in Table VII below.

TABLE VII

*Filtrability Qualities of Plutonous Peroxide Precipitated Under Refrigerated Conditions*

| Temperature (°C.) | Filtration | | Manifested solubility (mg Pu/liter) | Percent yield of Pu |
|---|---|---|---|---|
| | Rate | Filtrate | | |
| 10 | Negligible[1] | Clear | 38 | 99.3 |
| 20 | Slow | Turbid | 55 | 99.0[2] |

[1] Intolerably slow.
[2] Value obtained after vigorous centrifugation of the turbid filtrate to remove suspended $PuO_4$ therefrom.

The following two examples (Examples V and VI) demonstrate the efficacy of applicant's special two-temperature procedure in further accordance with the present invention.

EXAMPLE V

The general procedure of Example I was repeated, deriving solutions from different semi-works runs, through semi-works metathesis, with the significant exception that a different peroxide precipitation procedure was applied. That is, each solution was maintained at 20° C. for an hour's continuous addition of 30% aqueous hydrogen peroxide so as to make the solution 10% by weight in excess hydrogen peroxide, whereupon the resulting slurry was then aged within the range of 0° to 10° C. as indicated. Again all such semi-works-produced solutions approximated one normal in nitric acid and 0.2 normal in sulfuric acid, along with 30 to 40 grams per liter of dissolved lanthanum. In one instance, as indicated, additional ferric ion was added to increase the dissolved iron concentration to 0.05 M. During the aging at 0° to 10° C., the solutions were maintained quiescent to promote gravitational settling of the precipitates. Periodically during the aging and settling, the supernatant liquid was sampled and analyzed for both soluble and suspended plutonium values therein. In addition, much the same procedure was conducted in semi-works scale apparatus upon four batches of aqueous acidic plutonium solutions so derived. In all cases the precipitate was noted to settle with reasonable celerity, such that settling was substantially completed in about six hours. Results are tabulated in Table VIII below.

TABLE VIII

*Precipitation of Plutonous Peroxide by Instant Two-Temperature Procedure*

| Semi-works run from which solution derived | Laboratory Apparatus | | | Semi-works apparatus | | | |
|---|---|---|---|---|---|---|---|
| | 208-9 | 208-9 | 208-9 | 208-9 | 210-11 | 213-14 | 216-17 |
| Initial concentration of Pu, mg./l. | 226 | ¹226 | 800 | | | | |
| Concentration of Pu after H₂O₂ addition, mg./l. | 151 | 151 | 533 | | | | |
| Temperature of Precipitate Formation, °C. | 20 | 20 | 10 | | | | |
| Temperature of Aging and Settling, °C. | 10 | 10 | 10 | | | | |
| Manifested solubility of PuO₄ (mg. Pu/liter) after— | | | | | | | |
| 1 hour | 109 | 136 | 110 | | | | |
| 2 hours | | | | | | | |
| 3 hours | 107 | 120 | 96 | | | | |
| 4 hours | | | | | | | |
| 5 hours | 99 | 111 | 85 | | | | |
| 6 hours | | | | 58.8 | 57.7 | 66.1 | 96.5 |
| 24 hours | 82 | 99 | 70 | | | | |
| 2 days | | | | | | | 29.9 |

¹ Fe added to 0.05 M.

EXAMPLE VI

A number of aqueous acidic plutonium solutions were withdrawn from different semi-works scale runs as generally detailed in Example I. Again the solutions approximated 1 normal in nitric acid, 30 to 40 grams per liter in dissolved lanthanum, and upwards of about 400 milligrams per liter of dissolved plutonium content. Portions of the withdrawn solutions were treated in semi-works scale equipment, while other portions were treated in non-ferrous laboratory equipment. While maintaining each solution portion cooled to 20° C., aqueous 30% hydrogen peroxide was added continuously, with agitation, over a period of 1 hour to make the final solution 10% by weight in excess hydrogen peroxide. Thereafter each solution was agitated for an additional hour at 20° C. Then the temperature of each solution was reduced, and each solution was maintained refrigerated to 5° to 8° C.; agitation was stopped and the solution was maintained quiet to promote gravitational settling of the precipitate for 9 hours at 5° to 8° C. Thereafter the clear supernatant was syphoned off through a decantation pipe, the mouth of which was covered with a fine mesh stainless steel screen; the pipe was gradually lowered as the liquid level receded and withdrawal of liquid was stopped in time to leave a wet heel of the plutonous peroxide precipitate. The manifested solubilities of plutonous peroxide in the remaining supernatant were determined; the resulting values, along with the analytically determined content of dissolved iron in the original solutions, are tabulated in Table IX below.

TABLE IX

*Precipitation of Plutonous Peroxide in Laboratory and Semi-Works by Instant Two-Temperature Procedure*

| Run number | Fe (M) | Manifested solubility of PuO₄ (mg. Pu/liter) | |
|---|---|---|---|
| | | Semi-works | Laboratory |
| 268-269 | 0.0061 | 130 | 162 |
| 270-271 | 0.0017 | 207 | 203 |
| 272-273 | 0.0208 | 165 | |
| 274-275 | 0.0064 | 68 | |
| 276-277 | 0.0066 | 44 | |

As an additional beneficial attribute of applicant's special two-temperature procedure, it was discovered—some time after adoption of the same as a standard procedure in conventional plutonium production operations—that the two-temperature procedure promotes advantageous reduction of plutonium in higher valence states to tetravalent state, while still affording the advantages of operation under refrigerated conditions. That is, it became revealed that while, in aqueous acidic plutonium solutions arriving for peroxide precipitation in conventional plutonium production operations, it had formerly been believed that the dissolved plutonium was wholly in tetravalent oxidation state, nevertheless a substantial proportion of the plutonium—sometimes more than 50%—usually obtained in the hexavalent state. Furthermore while it was believed that any such chance occurrence of plutonium in hexavalent state would become automatically rectified by the presence of the hydrogen peroxide, which should serve as an effective reductant for plutonium to the tetravalent state, it was found that such hydrogen peroxide reduction of hexavalent plutonium becomes quite slow under refrigerated conditions. For instance, at 10° C., it appears that no immediate reduction of plutonium ensues upon hydrogen peroxide addition. At 20° C., though, immediate reduction of hexavalent plutonium upon hydrogen peroxide addition does prove to take place. Accordingly, in applicant's two-temperature procedure, not only does the initial formation of the plutonous peroxide at 20° C. afford a precipitate of advantageously larger, rapid-settling crystal size, but it importantly promotes advantageous substantial reduction of any dissolved higher-valent plutonium to the proper tetravalent state; thereupon the reduced plutonium forthwith undergoes precipitation, thus increasing the completeness of the recovery accomplished. Exemplary of this effect is Example VII following.

EXAMPLE VII

Employing non-ferrous laboratory equipment, four portions of aqueous acidic plutonium solution were prepared and provided. All were ca. 1 normal in nitric acid, ca. 0.2 normal in sulfuric acid, and contained about 400 milligrams dissolved plutonium per liter, all in hexavalent oxidation state. Two of the portions contained no dissolved lanthanum, while the other two contained ca. 37 grams dissolved lanthanum per liter. One solution portion with lanthanum and one solution portion without lanthanum were maintained refrigerated to 10° C. throughout subsequent operations, while the other two solution portions were maintained at 20° C. 30% aqueous hydrogen peroxide was added to each solution over a 30 minute period to a concentration of 10% by weight of stoichiometric excess hydrogen peroxide, which was followed by a 60 minute digestion period. In the case of solutions maintained refrigerated at 10° C., no precipitate was formed; this is interpreted as indicative that none of the hexavalent plutonium had yet been reduced to tetravalent state. Plutonous peroxide was noted to have precipitated, though, in the solution portions maintained at 20° C. Immediately thereafter all solutions were vigorously centrifuged, for segregation of any precipitate therein, and the apparent solubilities of plutonium in the remaining supernatant liquid was immediately determined. Results are tabulated in Table X below.

TABLE X

*Effect of Refrigerated Temperature on Plutonous Peroxide Precipitation From Solutions of Hexavalent Plutonium*

| Temperature (° C.) | Lanthanum (gm./liter) | Manifested solubilities of $PuO_4$ (mg. Pu/liter) |
| --- | --- | --- |
| 10 | 0 | (¹) |
| 10 | 37 | (¹) |
| 20 | 0 | 155 |
| 20 | 37 | 169 |

¹ No precipitate.

As a matter of terminology, it is to be understood that the expression "plutonous peroxide," as used throughout this specification and appended claims for denoting the precipitate formed in the instant process, is intended to embrace not only the discrete, chemically-pure compound so named, but also general technical precipitates—often impure and non-discrete—formed by the aqueous reaction of the peroxide anion with the tetravalent plutonium cation. More particularly, while the discrete compound is that having conventionally ascribed to it the formula $PuO_4$, it ordinarily tends to assume its monohydrate form $PuO_4 \cdot H_2O$ when formed in an aqueous medium. Furthermore, when precipitated from technical aqueous solutions, in the presence of various anions, the resulting plutonium precipitate tends to include significant quantities of such anions. For example, in the presence of even fractional molar concentrations of sulfate ion, the peroxide precipitate ordinarily contains considerable quantities of sulfate which resist removal by extensive washing; molar ratios of plutonium to sulfate of 2.6 through 3.0 are typical. Similar incorporation in the precipitates of nitrate, possibly acetate, and other anionic radicals which may be present in the system is likewise indicated. Normally, though, in addition to such other anionic radicals, the constitution of the precipitate includes at least three atoms of oxygen per atom of plutonium. As a possible generalization, these technical precipitates may supposedly be constituted of one or a mixture of components of formula $Pu_yO_{3y+z} \cdot X \cdot nH_2O$, where X may comprise $SO_4^{-2}$, $NO_3^{-1}$, $O^{-2}$, or other anionic radical. Beneficial applicability of the instant procedure is contemplated to extend broadly to the formation of all such precipitates. Accordingly, the expression "plutonous peroxide" is intended as generic to all precipitates of such origin, regardless of possible variations in their precise molecular structure stemming from the spurious presence of extraneous radicals.

While this invention has been described with particular reference to its application to conventional plutonium production operations involving bismuth phosphate and subsequent lanthanum fluoride carrier precipitation cycles, its applicability is by no means so restricted. The instant improved procedure may beneficially be applied to the precipitation, as peroxide, of iron and/or zirconium contaminated plutonium with different past histories and derived through various other procedures. Moreover while this invention has been described with particular reference to its application to the processing of specifically plutonium-239, it is inherently of much wider applicability. The present method is equally as well adapted to such processing of other plutonium isotopes, for example the non-fissionable Pu-238 isotope. Pu-238, valuable as a radioactive tracer, may be derived from non-fissionable sources through application of bismuth phosphate and lanthanum fluoride carrier precipitation cycles in ferrous metal apparatus wherein the present improved peroxide precipitation method may advantageously be employed for recovery of the same. Various additional applications of the instant method will become apparent to those skilled in the art. It is therefore to be understood that all matters contained in the above description and examples are illustrative only and do not limit the scope of the present invention.

What is claimed is:

1. A new and improved process for precipitating plutonous peroxide from an aqueous acidic solution containing plutonium ions along with dissolved metal contaminants of the group consisting of iron and zirconium which comprises maintaining said aqueous solution at a temperature of substantially 20° C., thereupon introducing aqueous hydrogen peroxide gradually into the solution being so maintained to thereby form a plutonous peroxide precipitate, thereafter reducing the temperature of said solution from said maintained 20° C. and thereupon maintaining said solution refrigerated to a temperature substantially within the range of 0° to 10° C., to thereby promote expeditious settling of said formed plutonous peroxide precipitate from the body of said solution, and subsequently decanting the aqueous supernatant liquid from the settled plutonous peroxide precipitate.

2. The process of claim 1 wherein said dissolved metal contaminants approximate 0.05 molar ferric ion and 0.001 molar tetravalent zirconium ion.

3. A new and improved process for precipitating plutonous peroxide from an aqueous acidic solution containing plutonium ions together with dissolved iron values, which comprises maintaining said aqueous solution at a temperature of substantially 20° C., thereupon introducing a stoichiometric excess of aqueous hydrogen peroxide gradually into the solution being so maintained to thereby form a plutonous peroxide precipitate, thereafter reducing the temperature of said solution from said maintained 20° C. and thereupon maintaining said solution refrigerated to a temperature substantially within the range of 0° to 10° C., to thereby promote expeditious settling of said formed plutonous peroxide precipitate from the body of said solution, and subsequently decanting the aqueous supernatant liquid from the settled plutonous peroxide precipitate.

4. The process of claim 3 wherein the plutonium ions in said aqueous acidic solution are in tetravalent oxidation state.

5. The process of claim 3 wherein said solution is an aqueous nitric acid solution.

6. The process of claim 3 wherein said aqueous solution is an aqueous nitric acid solution including sulfate ion.

7. The process of claim 3 wherein said aqueous acidic solution approximates 0.5 to 2 normal in nitric acid.

8. The process of claim 3 wherein said aqueous acidic solution approximates one normal in nitric acid.

9. The process of claim 3 wherein said aqueous acidic solution approximates one normal in nitric acid and 0.2 normal in sulfuric acid.

10. The process of claim 3 wherein said temperature substantially within the range of 0° to 10° C. is a temperature within the range of 5 to 8° C.

11. The process of claim 3 wherein said solution while being maintained at a temperature of substantially 20° is agitated, and wherein said aqueous solution while being maintained refrigerated as said to a temperature substantially to the range of 0° to 10° C. is retained quiescent.

12. The process of claim 3 wherein said settled plutonous peroxide precipitate, after said decanting of its aqueous supernatant liquid therefrom, is washed by slurrying in approximately one normal nitric acid, while maintaining the temperature of the system at substantially 20° C., thereafter reducing the temperature of the obtaining slurry to a temperature substantially within the range of 0° to 10° C., to thereby promote expeditious settling of the slurried plutonous peroxide precipitate from the body of said wash liquid, and subsequently decanting the aqueous wash liquid from the resettled plutonous peroxide precipitate.

References Cited in the file of this patent

UNITED STATES PATENTS 2,954,273    Barrick et al. _____ Sept. 27, 1960

OTHER REFERENCES

Harvey et al.: Journal of the Chemical Society, August 1947, page 1012. Copy in Scientific Library.